US011034314B2

United States Patent
Ikegaya et al.

(10) Patent No.: US 11,034,314 B2
(45) Date of Patent: Jun. 15, 2021

(54) VEHICULAR POWER SUPPLY SYSTEM WITH SEMICONDUCTOR SWITCHING DEVICE

(71) Applicant: Yazaki Corporation, Tokyo (JP)

(72) Inventors: Koji Ikegaya, Shizuoka (JP); Hideo Takahashi, Shizuoka (JP); Takafumi Toda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 84 days.

(21) Appl. No.: 16/423,553

(22) Filed: May 28, 2019

(65) Prior Publication Data

US 2019/0366952 A1  Dec. 5, 2019

(30) Foreign Application Priority Data

May 31, 2018  (JP) .............................. JP2018-104400

(51) Int. Cl.
*B60R 16/023* (2006.01)
*H02H 1/00* (2006.01)
*H02H 7/22* (2006.01)

(52) U.S. Cl.
CPC ...... *B60R 16/0238* (2013.01); *B60R 16/0239* (2013.01); *H02H 1/0007* (2013.01); *H02H 7/222* (2013.01)

(58) Field of Classification Search
CPC ............ B60R 16/0238; B60R 16/0239; H02H 1/0007; H02H 7/222
See application file for complete search history.

(56) References Cited

U.S. PATENT DOCUMENTS

| 6,182,807 B1* | 2/2001 | Saito .................. B60G 17/0185 191/2 |
| 6,900,555 B2* | 5/2005 | Sakamoto ................. H02J 1/06 307/10.1 |
| 2003/0098211 A1* | 5/2003 | Saito ................... B60R 16/0315 191/3 |
| 2004/0223275 A1* | 11/2004 | Yanagida ............ H02J 13/0003 361/62 |

(Continued)

FOREIGN PATENT DOCUMENTS

| EP | 3154143 A1 | 4/2017 |
| JP | 2016-060427 A | 4/2016 |

*Primary Examiner* — Fred E Finch, III
*Assistant Examiner* — Kevin H Sprenger
(74) *Attorney, Agent, or Firm* — Sughrue Mion, PLLC

(57) ABSTRACT

In a vehicular power supply system according to an embodiment, passage current of a power MOSFET of an IPD of a sub power distribution box monitored by a sub controller of the sub power distribution box is transmitted from the sub controller to a main controller of a main power distribution box. When energy storage amount of a load-based path calculated by integrating the passage current received by the main controller exceeds a predetermined value which is a overcurrent state, the main controller determines that the load-based path is in the overcurrent, and notifies the fact from the main controller to the sub controller. The sub controller switches the power MOSFET of the IPD of the load-based path set to the overcurrent by the notification to a non-conduction state to interrupt the energization of the load-based path.

4 Claims, 2 Drawing Sheets

(56) References Cited

U.S. PATENT DOCUMENTS

| | | | |
|---|---|---|---|
| 2006/0089757 A1* | 4/2006 | Yoshimura | H04L 12/40 |
| | | | 701/2 |
| 2007/0268048 A1* | 11/2007 | Komatsu | H03K 17/0822 |
| | | | 327/143 |
| 2016/0311327 A1* | 10/2016 | Nakahara | H03K 17/74 |
| 2016/0365721 A1* | 12/2016 | Soma | H03K 19/017509 |
| 2017/0317515 A1 | 11/2017 | Satake et al. | |
| 2017/0346274 A1* | 11/2017 | Nakahara | H03K 17/0822 |
| 2020/0014325 A1* | 1/2020 | Mikawa | H02P 29/68 |

\* cited by examiner

VEHICULAR POWER SUPPLY SYSTEM WITH SEMICONDUCTOR SWITCHING DEVICE

CROSS-REFERENCE TO RELATED APPLICATION

The present application is based on, and claims priority from Japanese Patent Application No. 2018-104400, filed May 31, 2018, the disclosure of which is incorporated herein by reference.

TECHNICAL FIELD

The present application relates to a system for supplying power from a vehicular power source to a load.

BACKGROUND ART

When power of a power source is branched and supplied to a plurality of loads in a vehicle, there is a case of protecting a power supply path corresponding to each load on the downstream side of a branch point from overcurrent by a fuse on the power supply path on the upstream side of the branch point.

In this case, each power supply path on the downstream side is protected from the overcurrent by fusing characteristics of the fuse matching a cable diameter of the power supply path on the upstream side. Accordingly, it is necessary to use a cable having the same diameter as the power supply path on the upstream side for each power supply path on the downstream side.

However, in the power supply path on the upstream side, a large current that is a sum of currents flowing through the respective power supply paths on the downstream side flows. Therefore, the cable diameter of the power supply path on the upstream side naturally becomes thick. Also, the cable diameter of each power supply path on the downstream side, which is required to have the same diameter as the upstream side, also becomes thick.

If a cable having the same diameter as the power supply path on the upstream side is used for each power supply path on the downstream side, a cable having a diameter larger than necessary for a current flowing through each load will be used for each power supply path on the downstream side. Therefore, a cable weight of each power supply path on the downstream side is increased, rather than using a thin cable having a diameter corresponding to the current matching the current flowing in the load.

Here, the weight increase of the entire power supply system by using cables having the same diameter as the upstream side for the power supply path on the downstream side can be as small as not to be annoying as long as the number of branches of the power supply path at the branch point is small. However, as the number of branches of the power supply path at the branch point increases, a weight increase that can not be overlooked occurs in the power supply system.

In view of the above, the present applicant has proposed in the past a power supply system that branches the power supply path of the power source for each load system in the main power distribution box, and branches the power supply path of each system for each load by the sub power distribution box (refer to JP 2016-060427A).

In this proposal, an intelligent power device (IPD) is installed in each power supply path for each system within the main power distribution box. The IPD is a device in which a semiconductor switching device such as a power MOSFET and a microcomputer are integrated.

The microcomputer executes various processing by executing a preinstalled program. The processing include processing for realizing a driver function of the semiconductor switching device, a monitoring function of a passage current value of each system-based power supply path, a self-protection function from overheating due to the passage current value of the semiconductor switching device, and the like.

Then, the microcomputer constantly monitors an output current and interrupts the output current of each circuit when it has detected a state requiring special protection. For this reason, the IPD of each system-based power supply path serves to protect the power supply path from the power source to the main power distribution box from the overcurrent, in place of the conventional fuse.

Further, in the above-described proposal, fuses are provided in each load-based power supply path branched by the sub power distribution box. For each fuse, one having fusing characteristics matching the current flowing in the load connected to each power supply path is used.

Therefore, in the power supply system proposed above, each load-based power supply path is constituted by a cable having a smaller diameter than the system-based power supply path, so that the weight increase of the entire power supply system can be suppressed.

SUMMARY

The above-described proposal is excellent in that the weight of the entire power supply system can be reduced. On the other hand, from the viewpoint of speeding up the overcurrent interruption of each load-based power supply path, there is still room for improvement, such as replacement of the fuse with a semiconductor switching device and adoption of a controller for overcurrent interruption control of the replaced semiconductor switching device.

However, if the fuse of each load-based power supply path is replaced by a set of a semiconductor switching device and a controller for overcurrent interruption control, it is inevitable that the cost is greatly increased.

The present application has been made in view of the above circumstances, and an object of the present application is to provide a vehicular power supply system capable of realizing both of reduction in weight of each load-based power supply path and speed-up of overcurrent interruption without significant increase of cost.

In order to achieve the above object, a vehicular power supply system according to an aspect of the present application includes: a plurality of system-based paths branched from a power supply path of a vehicle; a main power distribution box including a plurality of main semiconductor switching devices, each of the main semiconductor switching devices provided in a part of a corresponding system-based path, and a main controller for performing control to switch between conduction and non-conduction states of each of the main semiconductor switching devices; a plurality of load-based paths branched from each of the system-based paths; and a plurality of sub power distribution boxes each provided in a corresponding system-based path, each of the sub power distribution boxes including a plurality of sub semiconductor switching devices provided in a part of a corresponding load-based path, and a sub controller for performing control to switch between conduction and non-conduction states of each of the sub semiconductor switching devices and for transmitting passage current values of each of the sub semiconductor switching devices to the main controller. The main controller is configured to determine the overcurrent state of each of the sub semiconductor switching devices based on the passage current values of the sub semiconductor switching devices transmitted from the sub controller. When the main controller determines that one sub semiconductor switching device of the sub semiconductor switching devices is in the overcurrent state, the main controller notifies a corresponding sub controller that the one sub semiconductor switching device is in an overcurrent state. The corresponding sub controller executes interruption processing for switching one sub semiconductor switching device notified of the overcurrent state from the conduction state to the non-conduction state.

With the vehicular power supply system according to the aspect of the present application, in the main power distribution box, a power source such as a battery and an alternator of the vehicle is connected to the power supply path branched into the system-based paths. The main semiconductor switching devices of the respective system-based paths are individually turned on and off (conducted and non-conducted) by the control of the main controller according to, for example, the position (off, ACC, on, start, etc.) of the ignition switch of the vehicle.

Further, in the sub power distribution box, loads of the vehicle operating by receiving power supply are connected to the load-based paths branched from the system-based path, respectively. The sub semiconductor switching device of each load-based path is switched from the conduction state to the non-conduction state by the interruption processing of the sub controller when the load-based path is in the overcurrent state.

The overcurrent state of the load-based path is detected when the energy storage amount of the load-based path determined from the integrated value of the passage current value of the sub semiconductor switching device reaches a value serving as a criterion for determining the overcurrent state. The overcurrent state of the load-based path is detected by the main controller of the main power distribution box, to which the passage current value of the sub semiconductor switching device is transmitted by the sub controller.

When the main controller detects the overcurrent state of the load-based path, the fact is notified to the sub controller. Therefore, when receiving from the main controller the notification of the overcurrent state of the load-based path, the sub controller executes the interruption processing for switching the sub semiconductor switching device from the conduction state to the non-conduction state.

By switching the conduction state of the sub semiconductor switching device to the non-conduction state, it is possible to interrupt energization of the load-based path in the overcurrent state more quickly than stopping the energization by fusing of the fuse.

The sub controller provided in the sub power distribution box may only have a function of communicating with the main controller of the main power distribution box and a function of switching between the conduction state and the non-conduction state of the sub semiconductor switching device. That is, the sub controller may not have a function of detecting the overcurrent state of the load-based path.

Therefore, it is possible to configure the sub controller with an inexpensive programmable logic IC such as field-programmable gate array (FPGA), for example.

From the above, it is possible to realize both of reduction in weight of each load-based power supply path and speed-up of overcurrent interruption without significant increase of cost.

Each of the sub semiconductor switching devices may include an intelligent power device including a semiconductor switching device provided in the part of the corresponding load-based path. In this case, when the energy storage amount of the semiconductor switching device calculated from the passage current value of the semiconductor switching device of the intelligent power device monitored by the intelligent power device exceeds a predetermined determination value, the main controller detects the overcurrent state of the corresponding load-based path and notifies the overcurrent state to the sub controller.

In other words, the sub power distribution box includes the intelligent power device (IPD) and the IPD includes the semiconductor switching device.

The IPD monitors the passage current value of the semiconductor switching device and the main controller calculates the energy storage amount of the semiconductor switching device of the IPD from the monitored passage current value. When the calculated energy storage amount exceeds the determination value, the main controller detects the overcurrent state of the load-based path and notifies it to the sub controller.

Therefore, by configuring the sub semiconductor switching device of each load-based path with the semiconductor switching device of the IPD, it is possible to allow the IPD itself to monitor the passage current value of the sub semiconductor switching device and thereby achieve reduction of the burden on the sub controller and reduction of the function and cost.

When a passage current value of a corresponding sub semiconductor switching device is higher than the predetermined reference value, the determination value may be set to a value at which self-protection processing of switching from the conduction state to the non-conduction state is executed in order to prevent the corresponding sub semiconductor switching device from overheating due to increase in the on-resistance at an earlier time than the execution of the interruption processing.

When the load-based path becomes an overcurrent state, the main controller detects the overcurrent state before the load-based path emits smoke due to overcurrent.

However, the sub controller executing the interruption processing of the sub semiconductor switch recognizes the overcurrent state of the load-based path with a delay of the communication time required to receive the notification from the main controller. Further, the main controller detects the overcurrent state of the load-based path at least after receiving the passage current value of the sub semiconductor switching device from the sub controller.

In this way, in order to detect the overcurrent state of the load-based path by the main controller and to stop the energization of the load-based path in the overcurrent state by the interruption processing of the sub controller, in addition to the time required for detecting the overcurrent state, the communication time between the main controller and the sub controller is required.

For this reason, if the main controller detects the overcurrent state of the load-based path, there is a possibility that the timing of energization stop is delayed with respect to the progress of the overcurrent state of the load-based path under the condition that the passage current value in the load-based path is high.

Therefore, when the passage current value of the sub semiconductor switching device is higher than the predetermined reference value, the determination value of the overcurrent state of the load-based path may be set so that the self-protection processing is executed at an earlier time than the interruption processing.

In the self-protection processing of the sub semiconductor switching device, when the applied voltage of the sub semiconductor switching device decreases, the sub semiconductor switching device is switched from the conduction state to the non-conduction state in order to prevent overheating due to increase in the on-resistance. The determination value of the overcurrent state of the load-based path is set so that this self-protection processing is executed at an earlier time than the interruption processing.

Thereby, in a situation where the passage current value in the load-based path is high, the energization of the load-based path is stopped by the self-protection processing of the sub semiconductor switching device at an earlier time than the stop due to the overcurrent state. Therefore, in the situation where the passage current value in the load-based path is high and the time required for the load-based path to reach the overcurrent state becomes short, it is possible to reduce the possibility that the timing of energization stop is delayed with respect to the progress of the overcurrent state in the load-based path.

The vehicle may have a plurality of loads of the same application that are operated by being energized in synchronization with each other, and the loads of the same application may be dispersedly connected to load-based paths of mutually different sub power distribution boxes, respectively.

In other words, the plurality of loads of the same application are allocated to different sub power distribution boxes and connected to load-based paths of the respective sub power distribution boxes.

Each sub power distribution box is connected to a system-based path branched into a plurality of paths from the power supply path in the main power distribution box. The energization of each system-based path of the main power distribution box is individually switched by the processing performed by the main controller based on the energizing current of the main semiconductor switch.

Here, in one of the plurality of system-based paths included in the main power distribution box, even if the main semiconductor switching device is switched to the non-conduction state by the control of the main controller and the energization is stopped, energization of the other system-based paths is not stopped in conjunction with each other.

Accordingly, even if the main semiconductor switching device of the system-based path corresponding to one sub power distribution box is switched to the non-conduction state by the control of the main controller, the power supply to the other sub power distribution boxes is continued.

Therefore, even if the power supply to one of the plurality of loads of the same application allocated and connected to the respective sub power distribution boxes is cut off due to the failure of the corresponding sub power distribution box or the like, it is possible to realize functional safety for continuing power supply to the other loads of the same application.

Since a plurality of loads of the same application are not concentratedly connected to the same sub power distribution box, when the power consumption of the load is large, it is not necessary to thicken the cable diameters of all load-based paths of the sub power distribution box to which the load is connected in accordance with the magnitude of the current flowing through the loads.

That is, it is only necessary to thicken only the cable diameter of the load-based path connecting the load with large consumption current among the load-based paths of the sub power distribution box, and the cable diameters of the other load-based paths may be set according to the power consumptions of the loads connected to the respective load-based paths. Therefore, when there are a plurality of loads of the same application with large current consumption, it is possible to realize reduction in weight of each sub power distribution box without significant increase in cost.

With the vehicular power supply system according to the aspect of the present application, it is possible to realize both of reduction in weight of each load-based power supply path and speed-up of overcurrent interruption without significant increase in cost.

DETAILED DESCRIPTION

Figure 1:
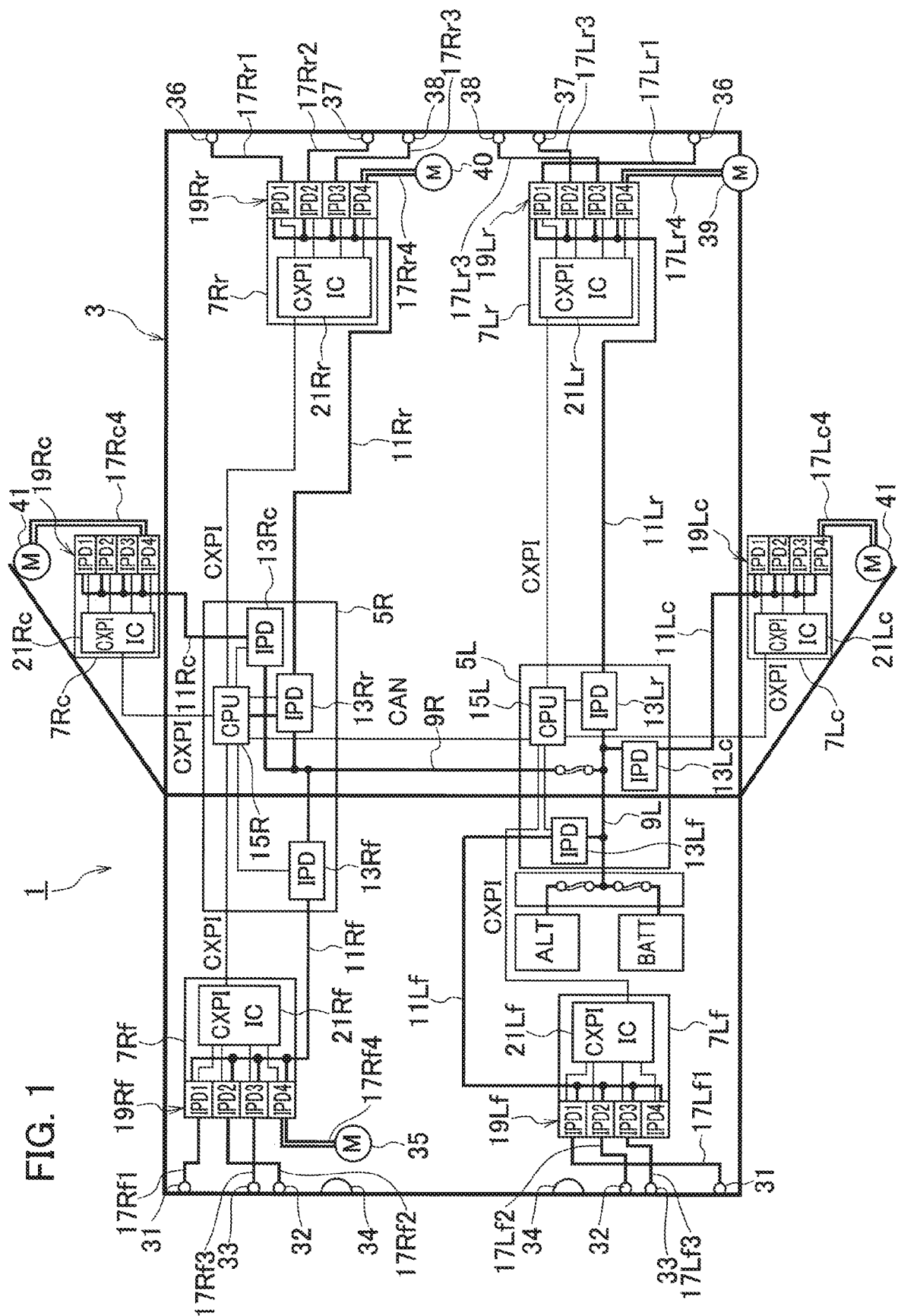
FIG. 1 is a circuit diagram illustrating a principle configuration of a vehicular power supply system according to an embodiment.

A vehicular power supply system according to an embodiment will be described below with reference to the drawings. FIG. 1 is a circuit diagram illustrating the principle configuration of the vehicular power supply system according to the embodiment.

A vehicular power supply system 1 according to the embodiment is a system provided in a vehicle 3 in order to supply power from an alternator ALT and a power source BATT to each load mounted on the vehicle 3.

On the front portion of the vehicle 3, left and right position lamps 31, fog lamps 32, daytime running lights 33, and head lamps 34 (illustration of wirings omitted) are arranged as loads. A motor 35 of an air conditioner water pump is arranged as a load in front of an engine room (not illustrated) of the vehicle 3.

On the rear portion of the vehicle 3, left and right position lamps 36, back-up lamps 37, and rear fog lamps 38 are arranged as loads. On the left rear side of the vehicle 3, a motor 39 for a fuel lid opener is arranged as a load. On the rear right side of the vehicle 3, a motor 40 for door lock of a hatchback door is arranged as a load.

Further, motors 41 for door lock are arranged as loads on the left and right doors of the vehicle.

In the following description, each of the lamps 31 to 34, 36 to 38 and the motors 35, 39 to 41 of the above-described vehicle 3 may be referred to as loads 31 to 41.

The vehicular power supply system 1 includes main power distribution boxes 5L, 5R and sub power distribution boxes 7Lf, 7Lc, 7Lr, 7Rf, 7Rc, 7Rr. The main power distribution boxes 5L, 5R and the sub power distribution boxes 7Lf, 7Lc, 7Lr, 7Rf, 7Rc, 7Rr branch the power supply paths 9L, 9R from the alternator ALT and the power source BATT stepwise.

The main power distribution box 5L and the sub power distribution boxes 7Lf, 7Lc, 7Lr constitute a supply system of the power source of the left half of the vehicle 3. The main power distribution box 5R and the sub power distribution boxes 7Rf, 7Rc, 7Rr constitute the supply system of the power source of the right half of the vehicle 3.

In the following description, when it is unnecessary to distinguish by the arrangement in the vehicle 3, all the main power distribution boxes 5L, 5R are sometimes collectively referred to as a main power distribution box 5.

In the following description, when it is unnecessary to distinguish by the arrangement in the left half of the vehicle 3, the sub power distribution boxes 7Lf, 7Lc, 7Lr in the left half are sometimes collectively referred to as a sub power distribution box 7L.

Likewise, when it is unnecessary to distinguish by the arrangement in the right half of the vehicle 3, the sub power distribution boxes 7Rf, 7Rc, 7Rr in the right half are sometimes collectively referred to as a sub power distribution box 7R.

Further, in the following description, when it is unnecessary to distinguish by the arrangement in the vehicle 3, all the sub power distribution boxes 7Lf, 7Lc, 7Lr, 7Rf, 7Rc, 7Rr are sometimes collectively referred to as a sub power distribution box 7.

The main power distribution boxes 5L, 5R branch the power supply paths 9L, 9R from the alternator ALT and the power source BATT to the front, middle, and rear three system-based paths 11Lf, 11Lc, 11Lr, 11Rf, 11Rc, 11Rr, respectively.

The sub power distribution boxes 7Lf, 7Lc, 7Lr, 7Rf, 7Rc, 7Rr are connected to the system-based paths 11Lf, 11Lc, 11Lr, 11Rf, 11Rc, 11Rr, respectively.

In the following description, when it is unnecessary to distinguish by the arrangement in the vehicle 3, all the power supply paths 9L, 9R may be sometimes collectively referred to as a power supply path 9.

In addition, in the following description, when it is unnecessary to distinguish by the arrangement in the left half of the vehicle 3, the system-based paths 11Lf, 11Lc, 11Lr in the left half are sometimes collectively referred to as a system-based path 11L.

Likewise, when it is unnecessary to distinguish by the arrangement in the right half of the vehicle 3, the system-based paths 11Rf, 11Rc, 11Rr in the right half are sometimes collectively referred to as a system-based path 11R.

Furthermore, in the following description, when it is unnecessary to distinguish by the arrangement in the vehicle 3, all the system-based paths 11Lf, 11Lc, 11Lr, 11Rf, 11Rc, 11Rr are sometimes collectively referred to as a system-based path 11.

The main power distribution boxes 5L, 5R include intelligent power devices (IPDs) 13Lf, 13Lc, 13Lr, and 13Rf, 13Rc, 13Rr, respectively.

The IPDs 13Lf, 13Lc, 13Lr, 13Rf, 13Rc, 13Rr are provided in the middle of the system-based paths 11Lf, 11Lc, 11Lr, 11Rf, 11Rc, 11Rr, respectively.

In the following description, the IPDs 13Lf, 13Lc, 13Lr provided in the system-based paths 11Lf, 11Lc, 11Lr in the left half of the vehicle 3 are sometimes collectively referred to as an IPD 13L when it is unnecessary to distinguish.

Likewise, the IPDs 13Rf, 13Rc, 13Rr provided in the system-based paths 11Rf, 11Rc, 11Rr of the right half of the vehicle 3 are sometimes collectively referred to as an IPD 13R when it is unnecessary to distinguish.

In addition, in the following description, IPDs 13Lf, 13Lc, 13Lr, 13Rf, 13Rc, 13Rr are sometimes collectively referred to as an IPD 13 when it is unnecessary to distinguish.

The main power distribution boxes 5L, 5R include main controllers 15L, 15R, respectively.

The main controller 15L controls the operation of the IPD 13L. The main controller 15R controls the operation of the IPD 13R.

In the embodiment, each IPD 13 incorporates a P-channel power MOSFET as a main semiconductor switching device and its driver circuit.

In the P-channel power MOSFET of each IPD 13, when the gate-source voltage exceeds a gate threshold voltage by the input of the control signal to the gate, the drain-source path is conducted due to the decrease of the on-resistance.

When the drain-source path of the P-channel power MOSFET of each IPD 13 is conducted, the system-based path 11 conducts. When the system-based path 11 is conducted, the power of the alternator ALT and the power source BATT is supplied from the main power distribution boxes 5L, 5R to the sub power distribution boxes 7Lf, 7Lc, 7Lr, 7Rf, 7Rc, 7Rr.

The main controllers 15L, 15R operate with a constant voltage (for example, 5 V) generated by a constant voltage source (not illustrated) from the output voltage of the alternator ALT or the power source BATT.

Then, the main controllers 15L, 15R control the P-channel power MOSFETs as the main semiconductor switching devices of the IPDs 13Lf, 13Lc, 13Lr, 13Rf, 13Rc, 13Rr to switch between the conduction and non-conduction states.

In the embodiment, the main controllers 15L, 15R receive information on the position (off, ACC, on, start, etc.) of the ignition switch of the vehicle 3 from a host controller (e.g. electronic control unit (ECU)) (not illustrated).

In accordance with the received position information of the ignition switch, the main controllers 15L, 15R individually control the P-channel power MOSFETs of the IPDs 13Lf, 13Lc, 13Lr, 13Rf, 13Rc, 13Rr to turn them on/off (conduction/non-conduction).

The main controllers 15L, 15R have a function of communicating with each other. Communication between the host controller (ECU) and the main controller 15L, 15R and communication between the main controllers 15L, 15R are performed on a local area network (LAN) system of the controller area network (CAN) standard. The LAN system of the CAN standard is mounted on the vehicle 3 as an in-vehicle LAN system.

The main controllers 15L, 15R have communication functions with the sub controllers 21Lf, 21Lc, 21Lr, 21Rf, 21Rc, 21Rr of the sub power distribution boxes 7Lf, 7Lc, 7Lr, 7Rf, 7Rc, 7Rr.

Communication between the main controller 15L, 15R and the sub controller 21Lf, 21Lc, 21Lr, 21Rf, 21Rc, 21Rr is performed on the LAN system of the clock extension peripheral interface (CXPI) standard. The LAN system of the CXPI standard is mounted in the vehicle 3 as the in-vehicle LAN system together with the LAN system of the CAN standard as the lower network of the LAN system of the higher CAN standard.

In the following description, when it is unnecessary to distinguish by the arrangement in the vehicle 3, all the main controllers 15L, 15R are sometimes collectively referred to as a main controller 15.

The sub power distribution boxes 7Lf, 7Lc, 7Lr in the left half of the vehicle 3 branch the system-based paths 11Lf, 11Lc, 11Lr from the main power distribution box 5L into four load-based paths 17Lf1 to 17Lf4, 17Lc1 to 17Lc4, 17Lr1 to 17Lr4, respectively.

The sub power distribution boxes 7Rf, 7Rc, 7Rr in the right half of the vehicle 3 branch the system-based paths 11Rf, 11Rc, 11Rr from the main power distribution box 5R into four load-based paths 17Rf1 to 17Rf4, 17Rc1 to 17Rc4, 17Rr1 to 17Rr4, respectively.

Each of the load-based paths 17Lf1 to 17Lf4, 17Lc1 to 17Lc4, 17Lr1 to 17Lr4, 17Rf1 to 17Rf4, 17Rc1 to 17Rc4, 17Rr1 to 17Rr4 selectively connects to load 31 to 33, 35 to 41 arranged in the vicinity.

The lamps 31 to 33 respectively arranged on the left and right sides in the front portion of the vehicle 3 are allocated to the left and right sub power distribution boxes 7Lf, 7Rf arranged in the front portion of the vehicle 3, and connected to the respective load-based paths 17Lf1 to 17Lf3, 17Rf1 to 17Rf3. The motor 35 arranged on the right side in the front portion of the vehicle 3 is connected to the load-based path 17Rf4 of the right sub power distribution box 7Rf arranged in the front portion of the vehicle 3.

Further, the lamps 36 to 38 respectively arranged on the left and right sides at the rear portion of the vehicle 3 are allocated to the right and left sub power distribution boxes 7Lr, 7Rr arranged at the rear portion of the vehicle 3, and connected to the respective load-based paths 17Lr1 to 17Lr3, 17Rr1 to 17Rr3. The motor 39 arranged on the left side at the rear portion of the vehicle 3 and the motor 40 arranged on the right side are connected to the load-based paths 19Lr4, 19Rr4 of the left and right sub power distribution boxes 7Lr, 7Rr arranged at the rear portion of the vehicle 3, respectively.

The motors 41 respectively arranged on the left and right doors of the vehicle 3 are respectively connected to the load-based paths 17Lr4, 17Rr4 of the left and right sub power distribution boxes 7Lc, 7Rc arranged on the left and right doors of the vehicle 3.

In the following description, when it is unnecessary to distinguish by the arrangement in the left half of the vehicle 3, the load-based paths 17Lf1 to 17Lf4, 17Lc1 to 17Lc4, 17Lr1 to 17Lr4 in the left half are sometimes collectively referred to as a load-based path 17L.

Likewise, when it is unnecessary to distinguish by the arrangement in the right half of the vehicle 3, the load-based paths 17Rf1 to 17Rf4, 17Rc1 to 17Rc4, 17Rr1 to 17Rr4 in the right half portion are sometimes collectively refer to as a load-based path 17R.

In the following description, when it is unnecessary to distinguish by the arrangement in the vehicle 3, all the load-based paths 17Lf1 to 17Lf4, 17Lc1 to 17Lc4, 17Lr1 to 17Lr4, 17Rf1 to 17Rf4, 17Rc1 to 17Rc4, 17Rr1 to 17Rr4 are sometimes collectively refer to as a load-based path 17.

The sub power distribution boxes 7Lf, 7Lc, 7Lr, 7Rf, 7Rc, 7Rr include IPDs 19Lf1 to 19Lf4, 19Lc1 to 19Lc4, 19Lr1 to 19Lr4, 19Rf1 to 19Rf4, 19Rc1 to 19Rc4, 19Rr1 to 19Rr4, respectively.

These IPDs are provided in the middle of the load-based paths 17Lf1 to 17Lf4, 17Lc1 to 17Lc4, 17Lr1 to 17Lr4, 17Rf1 to 17Rf4, 17Rc1 to 17Rc4, 17Rr1 to 17Rr4, respectively.

In the following description, the IPDs 19Lf1 to 19Lf4, 19Lc1 to 19Lc4, 19Lr1 to 19Lr4 provided in the respective load-based paths 17Lf1 to 17Lf4, 17Lc1 to 17Lc4, 17Lr1 to 17Lr4 in the left half of the vehicle 3 are sometimes collectively referred to as an IPD 19L when it is unnecessary to distinguish.

Likewise, the IPDs 19Rf1 to 19Rf4, 19Rc1 to 19Rc4, 19Rr1 to 19Rr4 provided in the respective load-based paths 17Rf1 to 17Rf4, 17Rc1 to 17Rc4, 17Rr1 to 17Rr4 in the right half are collectively referred to as an IPD 19R when it is unnecessary to distinguish.

In addition, in the following description, the IPDs 19Lf1 to 19Lf4, 19Lc1 to 19Lc4, 19Lr1 to 19Lr4, 19Rf1 to 19Rf4, 19Rc1 to 19Rc4, 19Rr1 to 19Rr4 are sometimes collectively referred to as an IPD 19 when it is unnecessary to distinguish.

The sub power distribution boxes 7Lf, 7Lc, 7Lr, 7Rf, 7Rc, 7Rr include sub controllers 21Lf, 21Lc, 21Lr, 21Rf, 21Rc, 21Rr, respectively.

The sub controllers 21Lf, 21Lc, 21Lr control the operations of the IPDs 19Lf1 to 19Lf4, 19Lc1 to 19Lc4, 19Lr1 to 19Lr4. The sub controllers 21Rf, 21Rc, 21Rr control the operations of the IPDs 19Rf1 to 19Rf4, 19Rc1 to 19Rc4, 19Rr1 to 19Rr4.

In the embodiment, each IPD 19 incorporates a P-channel power MOSFET as a sub semiconductor switching device and its driver circuit.

In the P-channel power MOSFET of each IPD 19, when the gate-source voltage exceeds the gate threshold voltage by the input of the control signal to the gate, the drain-source path is conducted due to the decrease in the on-resistance.

When the drain-source path of the P-channel power MOSFET of each IPD 19 is conducted, the load-based path 17 conducts. When the load-based path 17 conducts, the power of the alternator ALT and the power source BATT is supplied from the sub power distribution boxes 7Lf, 7Lc, 7Lr, 7Rf, 7Rc, 7Rr to the loads 31 to 33, 35 to 41.

The sub controllers 21Lf, 21Lc, 21Lr, 21Rf, 21Rc, 21Rr operate with a constant voltage (for example, 5 V) generated by a constant voltage source (not illustrated) from an output voltage of the alternator ALT or the power source BATT.

The sub controllers 21Lf, 21Lc, 21Lr, 21Rf, 21Rc, 21Rr control the P-channel power MOSFETs of the IPDs 19Lf1 to 19Lf4, 19Lc1 to 19Lc4, 19Lr1 to 19Lr4, 19Rf1 to 19Rf4, 19Rc1 to 19Rc4, 19Rr1 to 19Rr4 to switch between the conduction and non-conduction states.

In the embodiment, the sub controllers 21Lf, 21Lc, 21Lr, 21Rf, 21Rc, 21Rr receive the control signals of the loads 31 to 41 from the host controller (not illustrated).

In response to the received control signals of the loads 31 to 41, the sub controllers 21Lf, 21Lc, 21Lr, 21Rf, 21Rc, 21Rr individually control the P-channel power MOSFETs of the IPDs 19Lf1 to 19Lf4, 19Lc1 to 19Lc4, 19Lr1 to 19Lr4, 19Rf1 to 19Rf4, 19Rc1 to 19Rc4, 19Rr1 to 19Rr4 to turn on/off (conduction/non-conduction) them.

In the following description, when it is unnecessary to distinguish by the arrangement in the left half of the vehicle 3, the sub controllers 21Lf, 21Lc, 21Lr in the left half are sometimes collectively referred to as a sub controller 21L.

Likewise, when it is unnecessary to distinguish by the arrangement in the right half of the vehicle 3, the sub controllers 21Rf, 21Rc, 21Rr in the right half are sometimes collectively referred to as a sub controller 21R.

Further, in the following description, when it is unnecessary to distinguish by the arrangement in the vehicle 3, all the sub controllers 21Lf, 21Lc, 21Lr, 21Rf, 21Rc, 21Rr are sometimes collectively referred to as a sub controller 21.

Each IPD 13 of the main power distribution box 5 and each IPD 19 of the sub power distribution box 7 have an overheat interruption function.

The overheat interruption function is a function to switch the conduction state of each of the IPDs 13, 19 to the non-conduction state to interrupt the energization of the load-based path 17 when the power supply voltage of the alternator ALT or the power source BATT decreases.

The overheat interruption function is provided to prevent overheating due to increase in the on-resistance of the P-channel power MOSFET of each IPD 13, 19 when the power supply voltage of the power source BATT decreases.

In the embodiment, when the source potential of the P-channel power MOSFET of the IPD 13, 19 decreases to the gate threshold voltage as the determination value, the drain-source path is interrupted. Therefore, this operation is used as a self-protection function to interrupt the energization by the main power distribution box 5 and the sub power distribution box 7 when the power supply voltage of the power source BATT decreases to the gate threshold voltage.

Even when an N-channel power MOSFET is used as a semiconductor switching device, the same overheat interruption function can be realized with another configuration. Therefore, in the following description, it is assumed that each IPD 13, 19 merely has a self-protection function of the semiconductor switching device. That is, it is not specified whether the power MOSFET of each IPD 13, 19 is P-channel or N-channel.

Figure 2:
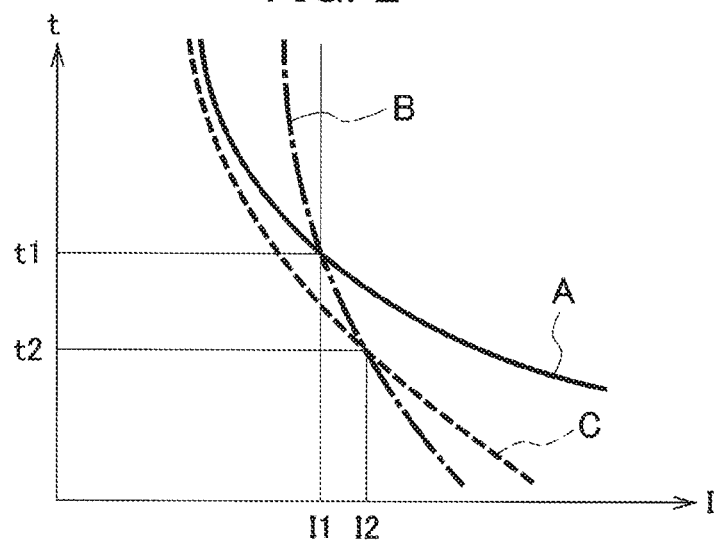
FIG. 2 is a graph illustrating the relationship between energization stop characteristic by a main semiconductor switching device and a sub semiconductor switching device of FIG. 1 and smoke-producing characteristics of a wire harness constituting a load-based path.

Each load-based path 17 may emit smoke when an overcurrent flows. The curve A of the graph of FIG. 2 illustrates the smoke-producing characteristics of the load-based path 17. Here, the horizontal axis of FIG. 2 is the passage current value I of the IPD 19 of the load-based path 17, and the vertical axis is the energization time t.

In the vehicular power supply system 1 according to the embodiment, when each load-based path 17 is in an overcurrent state, interruption processing is executed to switch the power MOSFETs in the conduction state of each IPD 19 of the sub power distribution box 7 to the non-conduction state.

Figure 3:
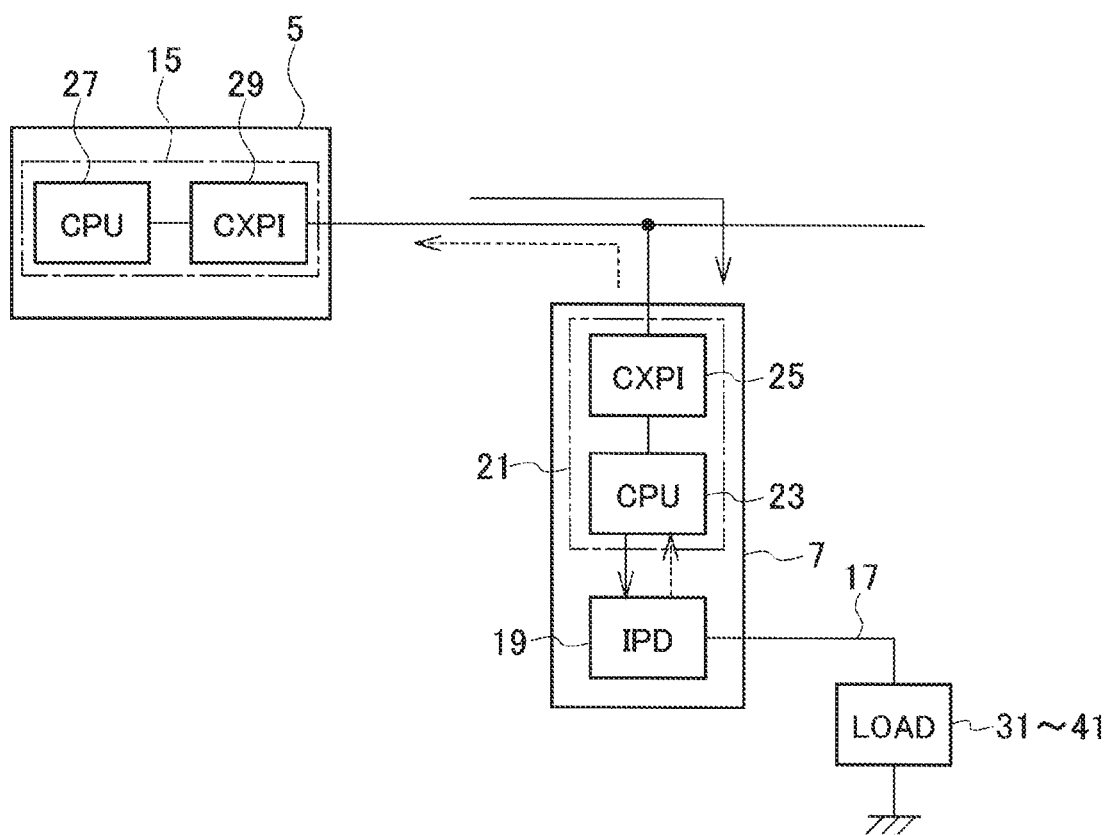
FIG. 3 is an explanatory diagram illustrating transmission and reception of signals performed between a main power distribution box and a sub power distribution box of FIG. 1.

In the interruption processing of each IPD 19 of the sub power distribution box 7, as illustrated in FIG. 3, in each sub power distribution box 7, a CPU 23 of the sub controller 21 acquires the passage current value of the power MOSFET monitored in each IPD 19 of the sub power distribution box 7. Then, the acquired passage current value of the power MOSFET is transmitted from a CXPI communication unit 25 of the sub controller 21 to the main controller 15 of the main power distribution box 5.

In the main power distribution box 5, a CXPI communication unit 29 of the main controller 15 receives the passage current value of the power MOSFET of each IPD 19 of the sub power distribution box 7. Then, a CPU 27 of the main controller 15 integrates the received passage current values of the power MOSFETs to calculate the energy storage amount of the load-based path 17.

Furthermore, when the calculated energy storage amount exceeds the determination value of the overcurrent state, the CPU 27 of the main controller 15 determines that the load-based path 17 is in the overcurrent state and notifies the fact from the CXPI communication unit 29 of the main controller 15 to the sub controller 21 of the sub power distribution box 7.

In the sub power distribution box 7, the CXPI communication unit 25 of the sub controller 21 receives a notification that the load-based path 17 is in the overcurrent state. Then, the CPU 23 of the sub controller 21 switches the power MOSFET of the IPD 19 of the load-based path 17 notified of the overcurrent state from the conduction state to the non-conduction state to perform the interruption processing for interrupting the energization of the load-based path 17.

In this way, when the load-based path 17 is in the overcurrent state, the interruption processing for switching the power MOSFET of each IPD 19 of the sub power distribution box 7 to the non-conduction state is performed, thereby interrupting the energization of the load-based path 17 more quickly than interrupting the energization of the load-based path 17 by fusing of the fuse.

Therefore, each load-based path 17 can be constituted by the cable diameter corresponding to the current flowing through each of the loads 31 to 33, 35 to 41 connected to the load-based path 17, so that the weight of the load-based path 17, eventually the weight of the vehicular power supply system 1 can be reduced.

In the vehicular power supply system 1 according to the embodiment, the passage current value of the power MOSFET of each IPD 19 of the sub power distribution box 7 is transmitted from the sub controller 21 of the sub power distribution box 7 to the main controller 15 of the main power distribution box 5. Then, the main controller 15 performs all the processing concerning the determination of the overcurrent state of the load-based path 17.

Accordingly, if the sub controller 21 has a function of switching the conduction state of the power MOSFET of the IPD 19 and a communication function with the main controller 15 while reducing the processing load of the sub controller 21, it is possible to realize a configuration of sufficiently functioning as the sub controller 21.

Therefore, it is possible to minimize the increase in cost of the vehicular power supply system 1 by adopting the IPD 19 so that the sub controller 21 can be constituted by an inexpensive programmable logic IC such as field-programmable gate array (FPGA), for example.

The determination value of the overcurrent state in the interruption processing is set to a value at which the switching from the conduction state to the non-conduction state of the power MOSFET of the IPD 19 is executed by a lower passage current value I and a shorter energization time t than the smoke-producing characteristics A of the load-based path 17 illustrated in FIG. 2. The broken line C in the graph of FIG. 2 illustrates the energization interruption characteristics of the load-based path 17 by the interruption processing.

The sub controller 21 of the sub power distribution box 7, after the main controller 15 of the main power distribution box 5 determines that the load-based path 17 is in the overcurrent state, recognizes the overcurrent state of the load-based path 17 by delaying by the communication time required to receive the notification of the fact. In addition, the main controller 15 detects the overcurrent state of the load-based path 17 at least after receiving the passage current value of the power MOSFET of the IPD 19 from the sub controller 21.

In this manner, in order to detect the overcurrent state of the load-based path 17 by the main controller 15 and to stop energization of the load-based path 17 in the overcurrent state by the interruption processing of the sub controller 21, in addition to the time required to detect the overcurrent state, the communication time between the main controller 15 and the sub controller 21 is required.

For this reason, if the main controller 15 of the main power distribution box 5 detects the overcurrent state of the load-based path 17, in a situation where the passage current value of the power MOSFET of the IPD 19 of the sub power distribution box 7 is high, there is a possibility that the timing of energization stop is delayed with respect to the progress of the overcurrent state of the load-based path 17.

Therefore, in the vehicular power supply system 1 according to the embodiment, when the passage current value of the power MOSFET of the IPD 19 of the sub power distribution box 7 is higher than a predetermined reference current value I2 illustrated in FIG. 2, the energization of the load-based path 17 is stopped by the self-protection processing of the IPD 19 of the sub power distribution box 7 which is executed at an earlier time than the interruption processing by the energization interruption characteristic C. A dash-dotted line B in FIG. 2 illustrates the overheat interruption characteristic by the self-protection processing of the IPD 19 of the sub power distribution box 7 when the voltage of the battery BATT is low.

Therefore, in the vehicular power supply system 1 according to the embodiment, when the passage current value of the power MOSFET of the IPD 19 of the sub power distribution box 7 is higher than the predetermined reference current value I2 illustrated in FIG. 2, the determination value of the interruption of the IPD 19 of the sub power distribution box 7 is set to the determination value of the self-protection processing executed at an earlier time than the interruption processing.

Thereby, when the passage current value of the power MOSFET of the IPD 19 of the sub power distribution box 7 is higher than the predetermined reference current value I2, at a timing t2 or earlier than the energization interruption characteristic C of the load-based path 17 by the interruption processing, the power MOSFET of the IPD 19 is switched to the non-conduction state by the overheat interruption characteristic B by the self-protection processing. Therefore, in a situation where the passage current value of the IPD 19 is high and the time required for the load-based path 17 to reach the overcurrent state is shortened, it is possible to reduce the possibility that the timing of energization stop is delayed with respect to the progress of the overcurrent state of the load-based path 17.

When the passage current value of the power MOSFET is not more than a current value I1 illustrated in FIG. 2, the switching of the power MOSFET to the non-conduction state by the overheat interruption characteristic B by the self-protection processing is delayed with respect to the smoke generation of the load-based path 17 by the smoke-producing characteristics A. However, the power MOSFET is switched to the non-conduction state by the interruption processing by the energization interruption characteristic C of the load-based path 17. As a result, it is possible to stop energization of the load-based path 17 at a timing earlier than smoke generation of the load-based path 17 by the smoke-producing characteristics A.

In the vehicular power supply system 1 according to the embodiment, the position lamps 31, the fog lamps 32, the daytime running lights 33, the position lamps 36, the backup lamps 37, the rear fog lamps 38, and the motors 41, which are arranged on the right side and left side of the vehicle 3 and are loads of the same application respectively, are allocated to the left and right sub power distribution boxes 7L, 7R and connected, respectively.

Therefore, in these loads 31 to 33, 36 to 38, 41 arranged on the left side and the right side of the vehicle 3, even if the power supply to either the left side or the right side is cut off due to a failure or the like of the corresponding sub power distribution box 7, the power supply to the other of the left side and the right side can be continued through the corresponding sub power distribution box 7, and functional safety can be realized.

In addition, for example, the left and right motors 41 having high power consumption are not concentratedly connected to the plurality of load-based paths 17 of one sub power distribution box 7. Therefore, it is unnecessary to thicken all the cable diameters of the load-based paths 17 of one sub power distribution box 7 in accordance with the magnitudes of the currents respectively flowing through the left and right motors 41.

That is, it is sufficient to thicken only the cable diameters of the load-based paths 17 connecting the loads (e.g. motor 41) having a large current consumption among the load-based paths 17 of the respective sub power distribution boxes 7, and the cable diameters of the other load-based paths 17 may be set to have thicknesses corresponding to the power consumptions of the loads (for example, the respective lamps 31 to 33, 36 to 38) connected to the respective load-based paths 17. Therefore, even when there are a plurality of loads (e.g. motor 41) of the same application with a large current consumption, it is possible to realize reduction in weight of each sub power distribution box 7 without significant increase in cost.

In the embodiment described above, the IPDs 13, 19 with the driver circuit incorporated together with the semiconductor switching device are used, but the present application can also be applied to the case of controlling the energization of the load-based path 17 by using a semiconductor switching device provided separately from the driver circuit.

What is claimed is:

1. A vehicular power supply system, comprising:
   a plurality of system-based paths branched from a power supply path of a vehicle;
   a main power distribution box comprising a plurality of main semiconductor switching devices, each of the plurality of main semiconductor switching devices provided in a part of a corresponding system-based path, and a main controller for performing control to switch between conduction and non-conduction states of each of the plurality of main semiconductor switching devices;
   a plurality of load-based paths branched from each of the system-based paths; and
   a plurality of sub power distribution boxes each provided in a corresponding system-based path, each of the plurality of sub power distribution boxes comprising a plurality of sub semiconductor switching devices provided in a part of a corresponding load-based path, and a sub controller for performing control to switch between conduction and non-conduction states of each of the plurality of sub semiconductor switching devices and for transmitting passage current values of the plurality of sub semiconductor switching devices to the main controller, wherein
   the main controller is configured to determine an overcurrent state of each of the plurality of sub semiconductor switching devices based on the passage current values of the plurality of sub semiconductor switching devices transmitted from the sub controller,
   when the main controller determines that one sub semiconductor switching device of the plurality of sub semiconductor switching devices is in the overcurrent state, the main controller notifies a corresponding sub controller that the one sub semiconductor switching device is in the overcurrent state, and
   the corresponding sub controller executes interruption processing for switching the one sub semiconductor switching device notified of the overcurrent state from the conduction state to the non-conduction state.

2. The vehicular power supply system of claim 1, wherein each of the sub semiconductor switching devices comprises an intelligent power device comprising a semiconductor switching device provided in the part of the corresponding load-based path, and
   when an energy storage amount of the semiconductor switching device calculated from the passage current value of the semiconductor switching device of the intelligent power device monitored by the intelligent power device exceeds a predetermined determination value, the main controller detects the overcurrent state of the corresponding load-based path and notifies the overcurrent state to the sub controller.

3. The vehicular power supply system of claim 2, wherein when a passage current value of a corresponding sub semiconductor switching device is higher than a predetermined reference value, the determination value is set to a value at which self-protection processing for switching from the conduction state to the non-conduction state is executed for preventing the corresponding sub semiconductor switching device from overheating due to increase in an on-resistance at an earlier time than execution of the interruption processing.

4. The vehicular power supply system of claim 1, wherein the vehicle has a plurality of loads for the same application that are operated by being energized in synchronization with each other, and the loads for the same application are dispersedly connected to the load-based paths of the mutually different sub power distribution boxes.

\* \* \* \* \*